April 25, 1933. A. STEINLE 1,905,070
TELESCOPE SIGHT
Filed Feb. 25, 1930
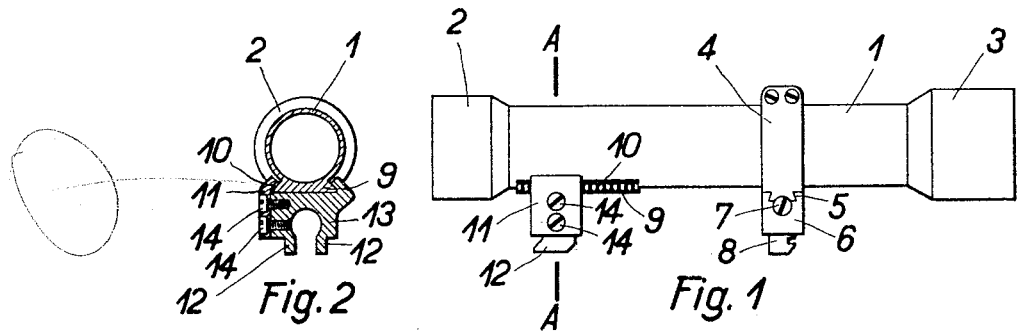
Inventor:
Adolf Steinle Patented Apr. 25, 1933

1,905,070

UNITED STATES PATENT OFFICE

ADOLF STEINLE, OF JENA, GERMANY, ASSIGNOR TO FIRM OF CARL ZEISS, OF JENA, GERMANY

TELESCOPE SIGHT

Application filed February 25, 1930, Serial No. 431,184, and in Germany March 6, 1929.

I have filed an application in Germany, March 6, 1929.

Hitherto telescope sights were as a rule attached to rifles by means of supports being secured to the rifle in the well-known manner and having clips for clamping the cylindrical tube of the telescope. The powerful recoil which occurs on firing the heavy charges now frequently used has a tendency to disarrange the telescope in the clamping devices. It was tried to do away with this inconvenience by soldering the supports to the telescope. However, the gun-maker who was in charge of this work very often met with difficulties when reassembling the telescope which he necessarily had to take to pieces before soldering, and the position of the optical parts of the telescope, which had been carefully adjusted previously, frequently gave rise to complaints.

The invention aims at avoiding additional soldering and its consequences and consists of a new device for attaching telescope sights by means of clamping devices which are fixed to the rifle in the well-known manner by supports and permanently stand even the strongest stress caused by the recoil, but, at the same time, do not eliminate the possibility of eventual necessary axial adjustments of the telescope sight with respect to the position of the clamping devices, which are conditioned by the construction of the rifle. According to the invention this advantage is arrived at by providing in the direction of the telescope axis and at least on one of the clamping devices a certain number of projections interlocking with corresponding projections on the tube of the telescope.

A very useful construction of the invention is arrived at e. g. by immovably securing to the telescope tube an attachment having rack teeth which mesh with corresponding teeth belonging to the clamping device. The said attachment part of the telescope tube conveniently belongs to the said tube itself or may be soldered thereto. The soldering allowing of being done previous to the fitting of the optical parts, the latter need not to be disassembled.

The accompanying drawing represents a constructional example of the invention. Figure 1 shows the example in elevation, Figure 2 a section along line A—A of Figure 1.

The telescope 1 has an objective sleeve 2 and an eyepiece sleeve 3. Near the eyepiece sleeve 3 the cylindrical part of the telescope 1 is provided with a clip 4 which, in a slide way 5 of a support 6, is displaceable transversely to the telescope axis in the usual manner and can be fixed by means of a bolt 7. The support 6 has a lock 8 for connecting the clamping device with the rifle. Near the objective sleeve 2 the cylindrical part of the telescope 1 has a dove-tailed lower part 9 which is of a construction similar to that of a slide and is provided with rack-teeth 10. The rack-teeth 10 mesh with corresponding teeth of a part 11 which is connected by means of bolts 14 with two lateral flanges 12 of a support 13 in such a way that the dove-tailed part 9 and consequently, also the telescope 1 are unmovably connected with the support 11, 13.

The clips 4 are to be loosely placed on the telescope 1 before finally fixing the eyepiece sleeve 3. Hereafter, without the necessity of taking the telescope 1 to pieces, the gunmaker fixes the fixing devices in a manner suiting the gun in question to the telescope 1 by driving home the screws 14, and clamps the clips 4 by screwing their respective bolts in such a way that the flanges 8 snugly fit in respective recesses previously worked in the rifle barrel. The teeth 10 safely prevent the recoil from causing any displacement of the telescope 1 even when strongly propellant powder is used for shooting.

I claim:

A device for fixing a telescope on a rifle, the said device consisting of two clamping devices adapted to detachably support the telescope and to engage projections in the rifle barrel, at least one of the clamping devices being provided with a row of projections approximately parallel to the axis of the telescope, and the telescope being equipped with rack-teeth interlocking with the projections of the clamping device.

ADOLF STEINLE.